(12) United States Patent
Tamaoka et al.

(10) Patent No.: US 7,345,388 B2
(45) Date of Patent: Mar. 18, 2008

(54) BRUSHLESS MOTOR AND RECORDING DISK DRIVING APPARATUS HAVING THE BRUSHLESS MOTOR

(75) Inventors: Takehito Tamaoka, Kyoto (JP); Hiroaki Hirano, Kyoto (JP); Masayoshi Saichi, Kyoto (JP); Junichi Takatera, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/162,095

(22) Filed: Aug. 29, 2005

(65) Prior Publication Data
US 2006/0238057 A1   Oct. 26, 2006

(30) Foreign Application Priority Data
Apr. 21, 2005 (JP) .............................. 2005-123905
May 9, 2005 (JP) .............................. 2005-135623

(51) Int. Cl.
*H02K 11/00* (2006.01)
(52) U.S. Cl. .............................. 310/67 R; 310/156.01; 310/156.12
(58) Field of Classification Search .............................. 310/156.01–156.84, 67 R
See application file for complete search history.

(56) References Cited

U.S. PATENT DOCUMENTS 5,760,504 A * 6/1998 Moser ...................... 310/67 R
6,282,053 B1 * 8/2001 MacLeod et al. ......... 360/98.07
6,528,909 B1 * 3/2003 Kan et al. ...................... 310/52
6,876,114 B2   4/2005 Knotts et al.
6,984,914 B2 * 1/2006 Kakuta et al. .............. 310/216
2003/0197436 A1  10/2003 Takahashi
2004/0061404 A1 *  4/2004 Fujii et al. .................. 310/216
2004/0189122 A1 *  9/2004 Obata et al. .................. 310/90

FOREIGN PATENT DOCUMENTS

| JP | H05-043777 U | 6/1993 |
|----|----|----|
| JP | 2004-248344 A | 9/2004 |
| JP | 2004-289881 A | 10/2004 |
| JP | 2004-304917 A | 10/2004 |
| JP | 2004-304918 A | 10/2004 |

* cited by examiner

*Primary Examiner*—Dang Le
*Assistant Examiner*—Nguyen Hanh
(74) *Attorney, Agent, or Firm*—Volentine & Whitt, PLLC (57) ABSTRACT

A brushless motor as an example of the invention has a stationary assembly 2 having a first housing member 10 made of a ferromagnetic material and a stator 20 held in the first housing member 10, and a rotor 6 having a rotor magnet 70 facing the stator 20. A annular shield plate 80 held by the rotor 6 is disposed between the rotor magnet 70 and the first housing member 10 and, further, an outer circumferential face 80*a* of the shield plate 80 is disposed between a magnetically neutral area 46 in the radial direction in the lower end of the rotor magnet 70 and the outer circumferential face of the rotor magnet 70.

18 Claims, 5 Drawing Sheets

BRUSHLESS MOTOR AND RECORDING DISK DRIVING APPARATUS HAVING THE BRUSHLESS MOTOR

BACKGROUND OF THE INVENTION

1. Field of the Invention

The present invention relates to a brushless motor and, more particularly, to a small and thin brushless motor for rotating a signal recording/reproducing apparatus. The invention also relates to a recording disk driving apparatus having the brushless motor.

2. Background Art

In recent years, as a hard disk drive (hereinbelow, called HDD) for recording/reproducing a magnetic disk as a signal recording/reproducing apparatus is becoming smaller, thinner, and more portable, reduction in the size, thickness, and current of a brushless motor mounted on the HDD is in demand. To meet the demand, an inner rotor type brushless motor in which a rotor magnet is disposed on the inner circumference side of a stator is being employed in recent years.

However, as the size and thickness of the inner rotor type brushless motor is further reduced, the following problems may occur. When the size and thickness of the whole brushless motor is reduced, a clearance in the axial direction between the rotor magnet and a base plate for holding a stator is also reduced. For example, when the base plate is made of a ferromagnetic material, there is a case such that part of the magnetic flux of the rotor magnet flows not to the stator side but to the magnetic base plate side and the torque decreases. In other words, a magnetic path is formed between the rotor magnet and the magnetic base plate, so that an effective magnetic path between the rotor magnet and the stator decreases, sufficient torque of the brushless motor cannot be obtained, and a start trouble such that the torque necessary at the time of starting the brushless motor is insufficient and the brushless motor does not start may occur.

BRIEF SUMMARY OF THE INVENTION

According to the invention, reduction in the size and thickness of a brushless motor can be realized, decrease in the torque is prevented, and lower current in the brushless motor can be realized.

Further, according to the invention, a recording disk driving apparatus having a small, thin, and low-current brushless motor can be provided.

A brushless motor as an example of the invention includes: a housing member made of ferromagnetic material; a stator stationary relative to the housing member; a rotor supported by a bearing mechanism so as to be rotatable relative to the housing member around a rotation center axis; and an annular rotor magnet held by the rotor.

The annular rotor magnet faces the stator via a radially spaced clearance and faces the housing member via a first axially spaced clearance.

An annular shield plate disposed in the first axially spaced clearance and extending in the radial direction is held by the rotor, and an outer circumferential face of the annular shield plate is located between the neutral area of the one end face and the outer circumference face of the rotor magnet.

In the brushless motor as an example of the invention, a magnetic circuit is formed by the rotor magnet and the annular shield plate, and the magnetic flux of the rotor magnet passes through the magnetic plate and flows in the rotor. Since the magnetic flux of the rotor magnet is not passed to the other members, generation of excessive magnetically attractive force between the rotor magnet and the other members can be suppressed, and current with respect to a predetermined torque can be lowered.

Since the annular shield plate is located between the magnetically neutral area and the outer circumferential face of the rotor magnet, particularly, part of the magnetic flux flowing to the stator side in the outer circumferential face of the rotor magnet can be prevented from flowing to the annular shield plate. In addition, generation of excessive magnetically attractive force between the rotor magnet and the housing member can be prevented.

DETAILED DESCRIPTION OF THE INVENTION

Embodiments of the invention will be described hereinbelow with reference to the drawings. In the following description, when the positional relations and directions of members are described by up, down, right and left, they indicate the positional relations and directions in the drawings but do not indicate the positional relations and directions when the members are assembled in actual equipment.

First Embodiment

Figure 1:
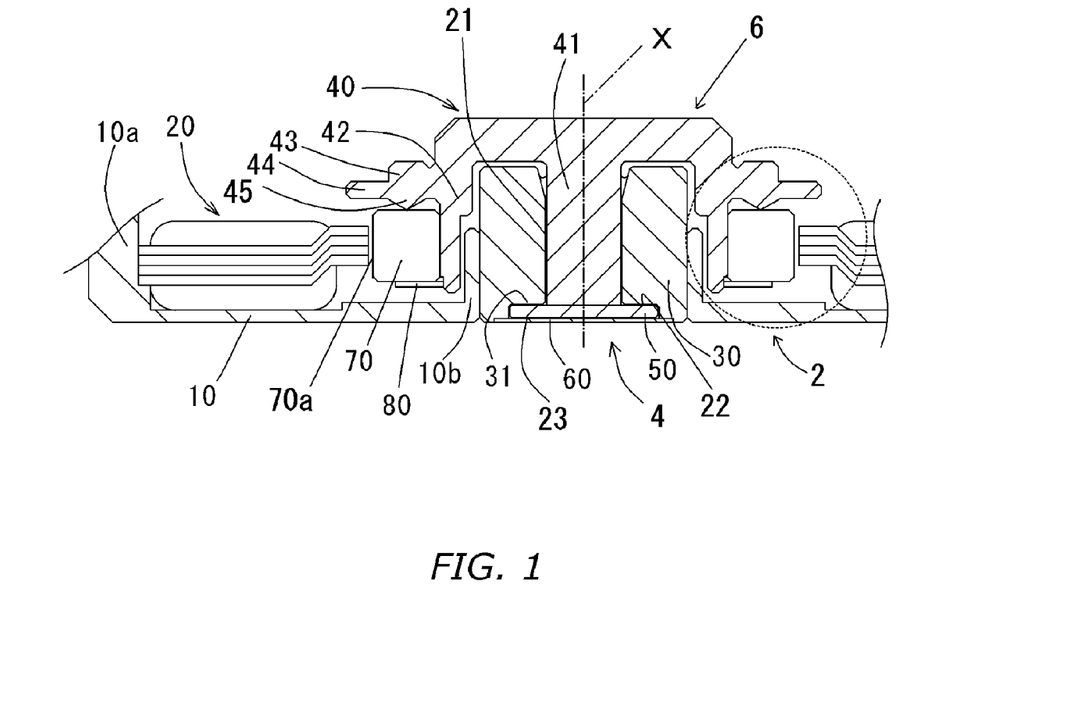
FIG. 1 is a longitudinal section showing part of a brushless motor of a first embodiment of the invention.

A brushless motor shown in FIG. 1 has a stationary assembly 2, a bearing mechanism 4 for supporting a rotor 6, and the rotor 6 rotatably supported by the bearing mechanism 4.

The stationary assembly 2 has a first housing member 10 formed by plastically deforming a steel plate made of ferromagnetic material, e.g., by stamping a steel plate made of ferromagnetic material using a press. The first housing member 10 has an annular recess portion 10a which opens upward in the axial direction, and a cylindrical portion 10b formed in the center of the first housing member 10. In the inner circumferential portion of the annular recess portion 10a, a stator 20 is held almost coaxially with the annular recess portion 10a. In the inner circumferential portion of the cylindrical portion 10b, a sleeve 30 having an almost cylindrical shape is held almost coaxially with the cylindrical portion 10b.

The rotor 6 has a shaft 41 facing the inner circumferential portion of the sleeve 30 over a small clearance, and an almost cup shaped rotor hub 40 integrally formed on the shaft 41. The rotor hub 40 is made of a ferromagnetic material such as SUS420, SUS430, or the like. A thrust plate 50 larger than the outer diameter of the shaft 41 is fixed to the bottom of the shaft 41. The thrust plate 50 is housed in a recess 31 in the sleeve 30 and faces the lower end face of the sleeve 30 and a plate 60 closing the lower end of the sleeve 30.

Oil is retained continuously in the small clearance between the outer peripheral surface of the shaft 41 and the inner circumferential face of the sleeve 30, the small clearance between the upper end face of the thrust plate 50 and the lower end face of the sleeve 30, and the small clearance between the lower end face of the thrust plate 50 and the upper end face of the plate 60.

In the small clearance between the outer peripheral surface of the shaft 41 and the inner circumferential face of the sleeve 30, a radial hydrodynamic bearing 21 is constructed in which dynamic pressure generating grooves for making the oil generate hydrodynamic pressure at the time of rotation of the rotor 6 is formed.

In the small clearance between the upper end face of the thrust plate 50 and the lower end face of the sleeve 30, an upper thrust hydrodynamic bearing 22 is constructed in which dynamic pressure generating grooves for making the oil generate pressure to the side of the rotation center axis X at the time of rotation of the rotor 6 is formed.

In the small clearance between the lower end face of the thrust plate 50 and the upper end face of the plate 60, a lower thrust hydrodynamic bearing 23 is constructed in which dynamic pressure generating grooves for making the oil generate pressure to the side of the rotation center axis X at the time of rotation of the rotor 6 is formed.

At the time of rotation, the rotor 6 is rotatably held by the radial hydrodynamic bearing 21, upper thrust hydrodynamic bearing 22, and lower thrust hydrodynamic bearing 23.

Figure 2:
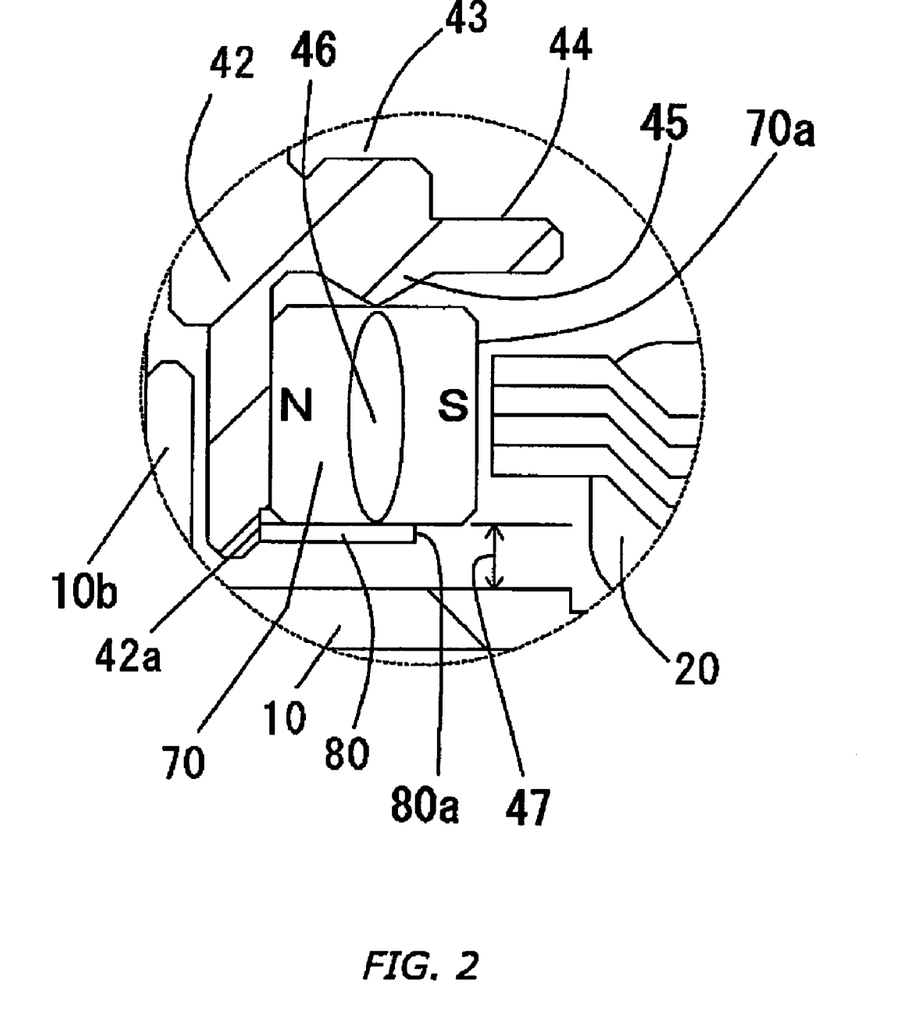
FIG. 2 is an enlarged longitudinal section of a dotted-line circle in FIG. 1.

Referring now to FIG. 2, the invention will be described in detail. FIG. 2 is a partial enlarged section of the motor shown in the dotted-line circle of FIG. 1.

In the outer circumferential portion of the rotor hub 40, a cylindrical portion 42 extending from the outer circumferential portion to the side of the first housing member 10 is formed. In the outer circumferential portion of the cylindrical portion 42, a disk mounting portion 43 which extends outward in the radial direction and on which a recording disk (reference numeral 120 in FIG. 5) is mounted is formed. Below the disk mounting portion 43 in the outer circumferential portion of the cylindrical portion 42, an annular-shaped rotor magnet 70 is fixedly held, and an outer circumferential face 70a of the rotor magnet 70 faces the stator 20 via a radially spaced clearance.

When current is passed to the stator 20 from an external power source, a magnetic field is generated in the stator 20. By interaction between the magnetic field and the rotor magnet 70, a predetermined torque is obtained and the rotor hub 40 rotates.

The rotor magnet 70 is polarized in the radial direction and has, for example, four N poles and four S poles alternately in the circumferential direction in the outer circumferential face 70a and the inner circumferential portion.

In the outer side in the radial direction of the disk mounting portion 43, an annular magnetic shield portion 44 extending in the radial direction is formed. The outer diameter of the magnetic shield portion 44 is set to be larger than that of the rotor magnet 70. Consequently, an effect of shielding parts above the magnetic shield portion 44 in the axial direction from the magnetism of the rotor magnet 70 can be obtained.

In a lower part of the disk mounting portion 43, a projection 45 projecting downward in the axial direction is formed. The projection 45 is in contact with an area 46 which is magnetically neutral between the S and N poles in the radial direction in the upper end face of the rotor magnet 70.

If the disk mounting portion 43 were in contact with the whole upper end face of the rotor magnet 70, much of the magnetic flux of the rotor magnet 70 would flow to the disk mounting portion 43 so that a limited amount of the magnetic flux would flow to the stator 20. In contrast, in the embodiment, only part (projection 45) of the lower end of the disk mounting portion 43 is in contact with the rotor magnet 70 and the projection 45 is further in contact with the magnetically neutral area 46, so that the magnetic flux of the rotor magnet 70 flowing disk mounting portion 43 can be remarkably decreased. Therefore, the magnetic flux of the rotor magnet 70 flows efficiently to the stator 20 side, so the current required to produce a predetermined torque is minimal.

As shown in FIG. 2, the lower end of the rotor magnet 70 faces the first housing member 10 via a first axially spaced clearance 47. In the embodiment, the first axially spaced clearance 47 is 0.5 mm or less, more preferably, 0.3 mm or less. To the lower end of the rotor magnet 70, an annular shield plate 80 is attached.

The inner circumferential portion of the shield plate 80 is fixed to a step 42a in the cylindrical portion 42. By the fixing, the shield plate 80 can be positioned with high precision in the radial direction, so that coaxiality precision between the rotor magnet 70 and the shield plate 80 can be improved. Since the precision of the position in the radial direction between the rotor magnet 70 and the shield plate 80 improves, the magnetic flux of the rotor magnet 70 can be made uniform in the circumferential direction. Therefore, rotation vibrations caused by fluctuations in the magnetic flux can be suppressed, and a brushless motor with low vibration and low noise can be provided.

An outer circumferential face 80a of the shield plate 80 is disposed between the area 46 which is magnetically neutral in the radial direction of the rotor magnet 70 and the outer circumferential face 70a of the rotor magnet 70. In particular, the outer diameter of the shield plate 80 is desirably formed so as to be greater than the average of the outer diameter and the inner diameter of the rotor magnet 70, that is, the shield pate 80 spans half or more of the rotor magnet 70 in the radial direction of the rotor magnet 70 (preferably, about $2/3$).

The shield plate 80 captures the magnetic flux flowing to the first housing member 10 side of the rotor magnet 70, so that the amount of the magnetic flux flowing to the first housing member 10 of the rotor magnet 20 can be decreased. Thus, an excessive magnetically attractive force and an eddy current loss occurring between the rotor magnet 70 and the first housing member 10 can be decreased. Since the magnetic flux of the rotor magnet 70 efficiently flows to the stator 20 side, the current can be lowered at a predetermined torque. Further, also at the time of start requiring the torque most, the necessary torque can be easily output and a start trouble can be prevented.

Conventionally, when the outer diameter of the shield plate is the same as that of the rotor magnet, there is a case that part of the magnetic flux flowing from the outer circumferential face of the rotor magnet to the stator side flows to the shield plate, and the necessary torque cannot be obtained. When the outer diameter of the shield plate is smaller than the magnetically neutral area, there is a case such that the magnetic flux of the rotor magnet excessively flows to the first housing member side and the necessary torque cannot be obtained. There is also a case such that due to a magnetically attractive force excessively generated between the rotor magnet and the first housing member, the rotor cannot obtain a predetermined floatation amount.

In the present invention, however, since the outer circumferential face 80a of the shield plate 80 is disposed between the magnetically neutral area 46 and the outer circumferential face 70a of the rotor magnet 70, part of the magnetic flux flowing to the stator 20 side in the outer circumferential face 70a of the rotor magnet 70 can be prevented from flowing to the shield plate 80. In addition, generation of an excessive magnetically attractive force between the rotor magnet 70 and the first housing member 20 can be prevented.

Between part of the lower end of the rotor magnet 70 on the outer side in the radial direction of the outer circumferential face 80a and the first housing member 10, a small magnetically attractive force is generated. By the small magnetically attractive force, a force of holding the rotor 6 works also in response to an external impact in the state where the rotor 6 does not rotate. Thus, occurrence of air bubbles which can be generated in the bearing can be prevented. Further, since a force of holding the rotor 6 acts, disturbance of the interface of oil due to movement of the rotor 6 is suppressed, and leakage of oil to the outside of the bearing can be prevented.

Such a shield plate 80 is made of a stainless steel (for example, SUS420 or SUS430) made of ferromagnetic material and, desirably, a ferrite stainless steel. As the stainless steel, although a martensitic stainless steel, it is hard. When processing is considered, a ferrite stainless steel is preferable. The stainless steels are corrosion resistant and can be applied under every environment. Since HDDs are used in every environment because of their portability of recent years, it is therefore desirable to use a corrosion-resistant member. A member obtained by performing corrosion-resistant surface process such as nickel plating on a silicon steel plate or an iron plate may be used.

Second Embodiment

Figure 3:
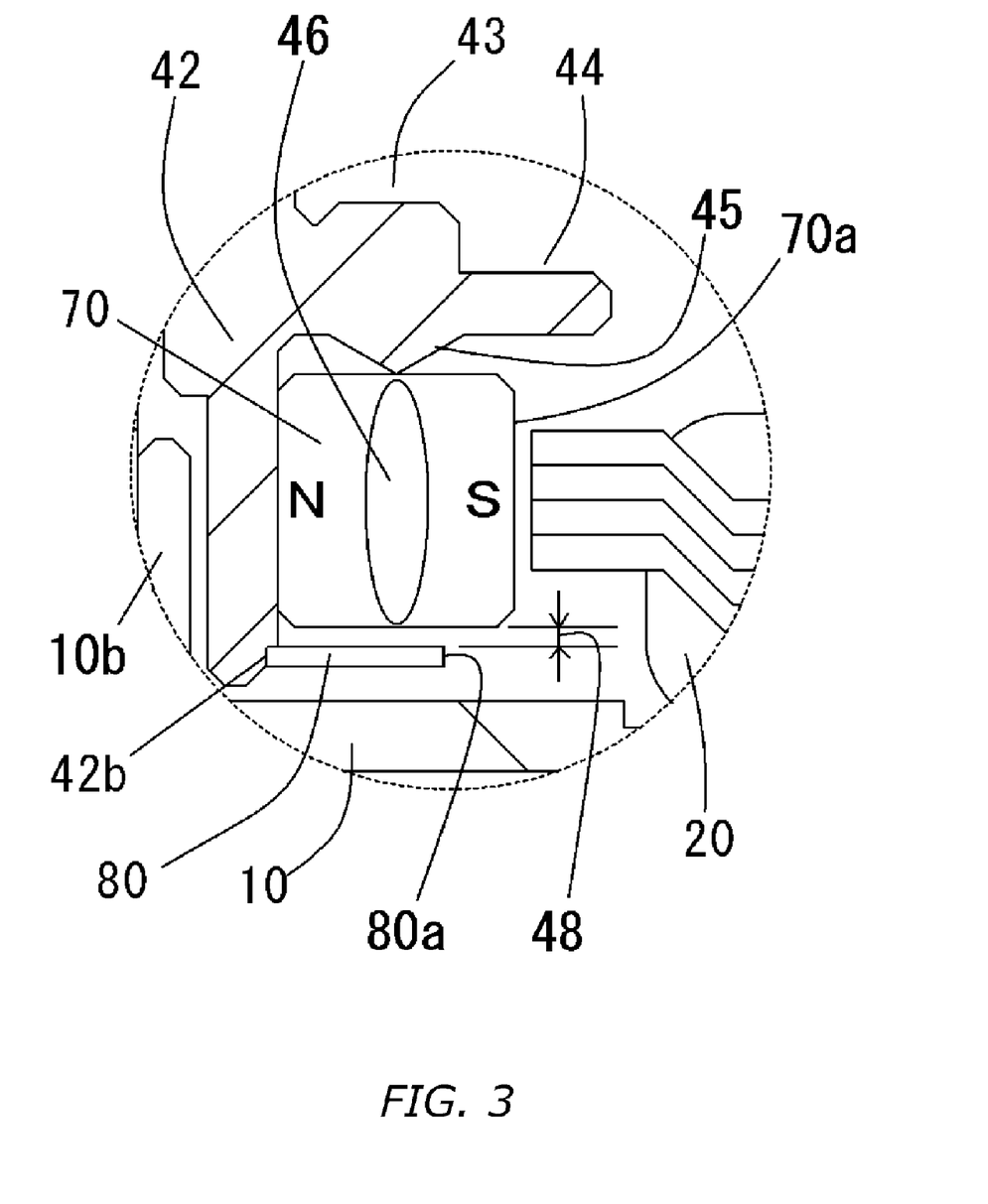
FIG. 3 is a longitudinal section showing a second embodiment of the invention.

Referring to FIG. 3, a second embodiment of the invention will be described in detail. FIG. 3 shows a modification of the structure of FIG. 2, and a basic configuration is similar to that of the brushless motor of FIG. 1.

In a lower end portion of the cylindrical portion 42 of the rotor hub 40, a step 42b for positioning the shield plate 80 in the axial and radial directions is formed. To the step 42b, the shield plate 80 is attached. Between the upper end of the shield plate 80 and the lower end of the rotor magnet 70, a second axially spaced clearance 48 is formed.

Consequently, the shield plate 80 can be positioned with respect to the rotor 6 at high precision. As a result, coaxiality precision between the rotor magnet 70 and the shield plate 80 can be improved, so that the rotor magnet 70 can be covered at a uniform ratio in the radial direction.

Further, by attaching the shield plate 80 to the step 42b, the second axially spaced clearance 48 can be formed uniformly in the circumferential direction. Since the magnetic flux flowing from the rotor magnet 70 to the shield plate 80 becomes uniform in the circumferential direction, the magnetic flux flowing from the rotor magnet 70 to the stator 20 becomes uniform in the circumferential direction. Therefore, the torque becomes uniform in the circumferential direction, so that rotational vibration can be suppressed, and reduction in noise can be realized.

By forming the second axially spaced clearance 48, the magnetic flux of the rotor magnet 70 flows not to the shield plate 80 side but to the stator 20 side, so that the magnetic flux flowing from the rotor magnet 70 to the shield plate 80 can be decreased, the magnetic flux flowing from the rotor magnet 70 to the stator 20 side can be increased, and a larger torque can be obtained. In addition, the current for a predetermined torque can be reduced.

Third Embodiment

Figure 4:
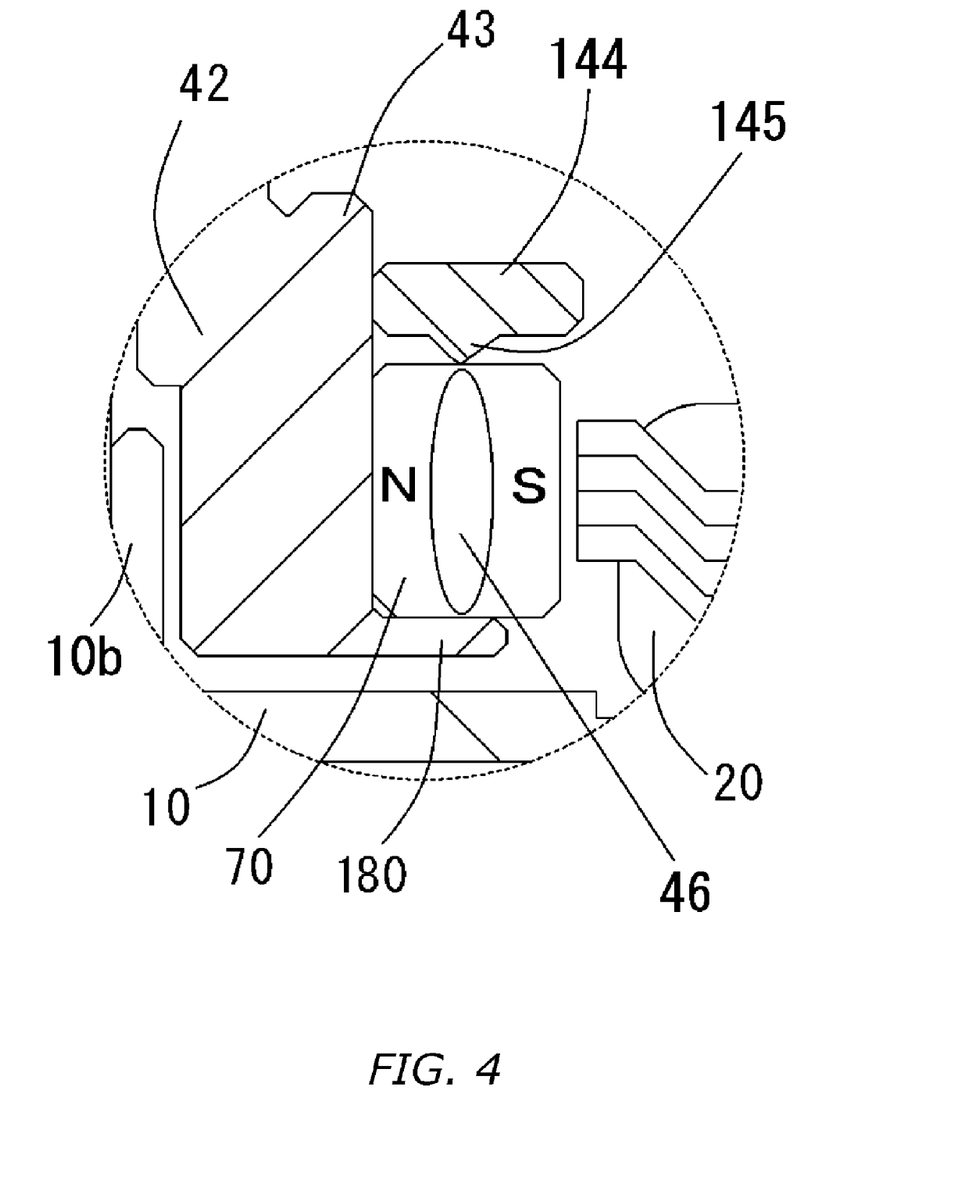
FIG. 4 is a longitudinal section showing a third embodiment of the invention.

With reference to FIG. 4, a third embodiment of the invention will be described in detail. FIG. 4 shows a modification of the structure of FIG. 2 and a basic configuration is similar to that of the brushless motor of FIG. 1.

At the lower end of the cylindrical portion 42 of the rotor hub 40, an annular shield plate 180 and the cylindrical portion 42 are one seamless component. With the configuration, effects similar to those of the foregoing first embodiment can be obtained and the strength of coupling between the cylindrical portion 42 and the shield plate 180 can be increased.

In the outer part in the radial direction of the disk mounting portion 43, an annular magnetic shield portion 144 extending in the radial direction is attached to the cylindrical portion 42. At the lower end of the magnetic shield portion 144, a projection 145 projecting downward in the axial direction is formed. The projection 145 is in contact with the magnetically neutral area 46 between the S pole and the N pole in the radial direction in the upper end face of the rotor magnet 70. With the configuration, effects similar to those of the first embodiment can be obtained.

In the third embodiment, a second axially spaced clearance may be formed between the upper end of the shield plate 180 and the lower end of the rotor magnet 70.

Recording Disk Driving Apparatus

Figure 5:
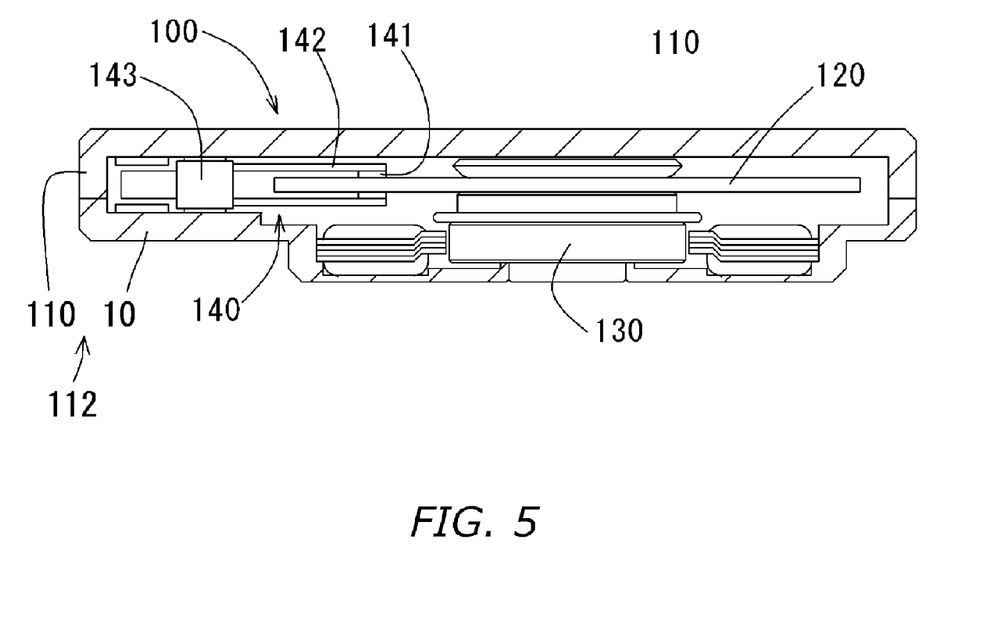
FIG. 5 is a longitudinal section showing an embodiment of a recording disk driving apparatus in the invention.

An embodiment of a recording disk driving apparatus 100 according to the invention will be described by referring to FIG. 5. FIG. 5 is a cross section of the recording disk driving apparatus 100.

The recording disk driving apparatus 100 has a rectangular housing 112 constructed by a first housing member 10 and a second housing 110. The inside that is formed by the housing 112 is a clean space in which the amount of dust and the like is extremely small and a brushless motor 130 on which a disc-shaped hard disk 120 for recording information is mounted is fixed to the first housing member 10.

In the housing 112, a head moving mechanism 140 for reading/writing information from/to the hard disk 120 is constructed. The head moving mechanism 140 has a magnetic head 141 for reading/writing information from/to the hard disk 120, an arm 142 supporting the magnetic head 141, and an actuator 143 for moving the magnetic head 141 and the arm 142 to required positions on the hard disk 120.

By applying the brushless motor of the present invention as the brushless motor 130 of the recording disk driving apparatus 100, sufficient functions are assured. Moreover, reduction in the size and thickness of the recording disk driving apparatus 100 can be realized, and the recording disk driving apparatus having high reliability and durability can be provided.

Although the embodiments of the brushless motor according to the invention and the recording disk driving apparatus having the brushless motor have been described above, the invention is not limited to the embodiments but can be variously modified without departing from the gist of the invention.

For example, although the sleeve 30 is used for rotatably supporting the shaft 41 in the embodiments of the invention, the invention is not limited to the sleeve 30 but may use a ball bearing. The sleeve may be formed by two members; a bearing member formed by an oil-impregnated member, and a bearing holding member for holding the bearing member. In this case, the bearing holding member and the plate may be formed integrally.

For example, the rotor hub and the shaft may be formed by separate members. Further, the shaft and the thrust plate may be formed integrally.

By making the magnetically neutral area in the rotor magnet project upward in the axial direction, the area may be in contact with the rotor hub. However, when processing is considered, it is preferable to form a projection in the rotor hub 40.

Although the embodiments of the invention relate to the so-called inner rotor type motor in which the rotor magnet is disposed on the inside in the radial direction of the stator, the invention is not limited to the inner rotor type motor. For example, the invention can be also applied to a so-called outer rotor type motor in which the rotor magnet is disposed on the outside in the radial direction of the stator.

The invention can use, as the bearing mechanism, a ball bearing, a gas dynamic pressure bearing, and a so-called hybrid bearing of a radial air dynamic pressure bearing and a thrust fluid dynamic pressure bearing.

Particularly, with respect to the gas dynamic pressure bearing and the hybrid bearing, if the magnetically attractive force which is generated between the rotor magnet and the first housing member is strong, various problems may occur. For example, the magnetically attractive force is not always uniform in the circumferential direction and the strength of the magnetically attractive force varies. Since the rigidity of the air dynamic pressure bearing is lower than that of the fluid dynamic pressure bearing, run-out occurs due to variations in the strength of the magnetically attractive force during rotation. As a result, a recording disk runs out and there is the possibility that an influence is exerted on reading/writing by a magnetic head. When the rotor rotates at low speed, the influence of variations in the magnetically attractive force is exerted largely, and a rotary member and a stationary member in the bearing mechanism may come into contact with each other. Consequently, by reducing the magnetically attractive force between the rotor magnet and the first housing member by the shield plate, variations in the magnetically attractive force can be suppressed so that problems as described above can be solved. Therefore, the present invention is preferable for the air dynamic pressure bearing and the hybrid bearing.

The first housing member 10 may be at least part of the housing 112.

What is claimed is:

1. A brushless motor comprising:
   a housing member made of ferromagnetic material;
   a stator fixed relative to the housing member;
   a rotor hub supported in the motor so as to be rotatable relative to the housing member around a central axis of rotation, the rotor hub including a cylindrical portion which extends longitudinally in the direction of the axis of rotation, and the cylindrical portion having a step in a distal end thereof,
   wherein the cylindrical portion has a first cylindrical circumferential surface, and a second circumferential surface disposed coaxially with the first cylindrical circumferential surface, the second circumferential surface constituting the distal end of the cylindrical portion, and the diameter of the rotor hub at the second circumferential surface being different than the diameter of the rotor hub at the first cylindrical circumferential surface such that the second circumferential surface defines the step;
   an annular rotor magnet fixed to the rotor hub so as to form a rotor therewith, the annular rotor magnet extending alongside the first cylindrical circumferential surface of the cylindrical portion of the rotor hub, the annular rotor magnet having a circumferential face opposing the stator as spaced radially therefrom, and one axial end face opposing the housing member as spaced axially therefrom, and the rotor magnet being radially polarized so as to have one polarity at an outer circumferential portion thereof, an opposite polarity at an inner circumferential portion thereof, and an interpole, magnetically neutral area located between the inner and outer circumferential portions of opposite polarities; and
   an annular shield plate fixed to the rotor hub, the annular shield plate extending alongside the second cylindrical circumferential surface of the cylindrical portion of the rotor hub so as to be located between the rotor magnet and the housing member and so as to have a circumferential face that opposes the stator, and the circumferential face of the annular shield plate that opposes the stator being juxtaposed in the axial direction with a region of the rotor magnet located between the magnetically neutral area and the circumferential face of the rotor magnet that opposes the stator, whereby the annular shield plate is disposed coaxially with the rotor magnet.

2. A brushless motor according to claim 1, wherein the annular shield plate is axially spaced apart from said one axial end face of the rotor magnet.

3. A brushless motor according to claim 1, wherein the annular shield plate is in contact with said one axial end face of the rotor magnet.

4. A brushless motor according to claim 1, wherein the rotor is disposed radially inwardly of the stator, and the outer diameter of the annular shield plate is larger than the average of the outer diameter and the inner diameter of the rotor magnet.

5. A brushless motor according to claim 1, wherein the cylindrical portion is made of ferromagnetic material.

6. A brushless motor according to claim 1, wherein the cylindrical portion is made of a stainless steel.

7. A brushless motor according to claim 1, wherein the rotor hub further comprises a magnetic shield portion contacting the other axial end face in of the rotor magnet.

8. A brushless motor according to claim 1, wherein said one axial end face of the rotor magnet is axially spaced from the housing member by a distance of 0.5 mm or less.

9. A brushless motor according to claim 8, wherein said one axial end face of the rotor magnet is axially spaced from the housing member by a distance of 0.3 mm or less.

10. A brushless motor according to claim 1, further comprising a fluid dynamic pressure bearing supporting the rotor hub such that the rotor hub is rotatable relative to the housing member.

11. A recording disk driving apparatus comprising:
    a housing member made of ferromagnetic material;
    a stator fixed relative to the housing member;
    a rotor hub supported in the apparatus so as to be rotatable relative to the first housing member round a central axis of rotation, and including a cylindrical portion and a disk mounting portion, the cylindrical portion extending longitudinally in the direction of the axis of rotation and having a step in a distal end thereof,
    wherein the cylindrical portion has a first cylindrical circumferential surface, and a second circumferential surface disposed coaxially with the first cylindrical circumferential surface, the second circumferential surface constituting the distal end of the cylindrical portion, and the diameter of the rotor hub at the second circumferential surface being different than the diameter of the rotor hub at the first cylindrical circumferential surface such that the second circumferential surface defines the step;

a recording disk supported by and fixed to the disk mounting portion of the rotor hub so as to rotate therewith about the central axis of rotation;

an annular rotor magnet fixed to the rotor hub so as to form a rotor therewith, the annular rotor magnet extending alongside the first cylindrical circumferential surface of the cylindrical portion of the rotor hub, the annular rotor magnet having a circumferential face opposing the stator as spaced radially therefrom, and one axial end face opposing the housing member as spaced axially therefrom, and the rotor magnet being radially polarized so as to have one polarity at an outer circumferential portion thereof, an opposite polarity at an inner circumferential portion thereof, and an inter-pole, magnetically neutral area located between the inner and outer circumferential portions of opposite polarities;

an annular shield plate fixed to the rotor hub, the annular shield plate extending alongside the second cylindrical circumferential surface of the cylindrical portion of the rotor hub so as to be located between the rotor magnet and the housing member and so as to have a circumferential face that opposes the stator, and the circumferential face of the annular shield plate that opposes the stator being juxtaposed in the axial direction with a region of the rotor magnet located between the magnetically neutral area and the circumferential face of the rotor magnet that opposes the stator, whereby the annular shield plate is disposed coaxially with the rotor magnet;

a data access mechanism for writing/reading information onto/from the recording disk; and another housing member fixed to the first housing member, the first housing member and said another housing member constituting a housing of the apparatus, and the recording disk, the stator, the rotor and the data access mechanism all being disposed within the housing.

12. A brushless motor according to claim 1, wherein the rotor hub includes an annular magnetic shield portion extending radially from the cylindrical portion above the rotor magnet, a peripheral portion of the magnetic shield portion opposing and spaced in the axial direction from the polarized circumferential portion of the rotor magnet that opposes the stator.

13. A brushless motor according to claim 12, wherein the annular magnetic shield portion has a projection whose end contacts the rotor magnet at the inter-pole, magnetically neutral area thereof.

14. A brushless motor comprising:

a housing member made of ferromagnetic material;

a stator fixed relative to the housing member; and a rotor including a rotor hub supported in the motor so as to be rotatable relative to the housing member around a central axis of rotation, an annular rotor magnet fixed to the rotor hub, the rotor hub including a cylindrical portion which extends longitudinally in the direction of the axis of rotation, and a magnetic shield portion extending radially from the cylindrical portion above the rotor magnet, the annular rotor magnet extending alongside the cylindrical portion of the rotor hub, the annular rotor magnet having a circumferential face opposing the stator as spaced radially therefrom, one axial end face opposing the housing member, and another axial end face opposing the magnetic shield portion, and the rotor magnet having areas of opposite polarities, and an inter-pole, magnetically neutral area located between the areas of opposite polarities, and the magnetic shield portion having a projection extending in the axial direction, a distal end of the projection contacting the rotor magnet at the inter-pole, magnetically neutral area thereof.

15. A brushless motor according to claim 14, wherein the magnetic shield portion and the rotor magnet are only in contact with one another at the axial end of the projection.

16. A brushless motor according to claim 15, wherein the axial end of the projection only contacts the rotor magnet at the inter-pole, magnetically neutral area thereof.

17. A brushless motor according to claim 14, wherein the magnetic shield portion is part of disk mounting portion of the rotor hub configured to support a recording disk for storing information.

18. A brushless motor according to claim 14, wherein the rotor magnet is radially polarized so as to have one polarity at an outer circumferential portion thereof, and an opposite polarity at an inner circumferential portion thereof, whereby the inter-pole, magnetically neutral area is located between the inner and outer circumferential portions of opposite polarities.

* * * * *